United States Patent
Ullah

(10) Patent No.: US 8,167,314 B2
(45) Date of Patent: May 1, 2012

(54) DISTORTION RESISTANT FACE SEAL COUNTERFACE SYSTEM

(75) Inventor: M. Rifat Ullah, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 387 days.

(21) Appl. No.: 12/415,427

(22) Filed: Mar. 31, 2009

(65) Prior Publication Data
US 2010/0244385 A1 Sep. 30, 2010

(51) Int. Cl.
*F16J 15/34* (2006.01)
(52) U.S. Cl. .......... 277/370; 277/377
(58) Field of Classification Search .......... 277/358–360, 277/370, 377, 399
See application file for complete search history.

(56) References Cited

U.S. PATENT DOCUMENTS

| | | | |
|---|---|---|---|
| 2,586,739 A | 2/1952 | Summers | |
| 2,761,712 A | 9/1956 | Ecker | |
| 2,802,679 A | 8/1957 | Taltavall | |
| 2,992,842 A | 7/1961 | Shevchenko et al. | |
| 3,819,191 A * | 6/1974 | Voitik | 277/360 |
| 4,020,910 A | 5/1977 | Peterson et al. | |
| 4,087,097 A | 5/1978 | Bossens et al. | |
| 4,415,165 A | 11/1983 | Martini | |
| 4,519,719 A | 5/1985 | Burr | |
| 4,659,092 A | 4/1987 | Wallace et al. | |
| 4,695,063 A | 9/1987 | Schmitt et al. | |
| 4,872,767 A | 10/1989 | Knapp | |
| 5,024,451 A | 6/1991 | Borowski | |
| 5,135,235 A * | 8/1992 | Parmar | 277/360 |
| 5,137,284 A | 8/1992 | Holder | |
| 5,183,270 A | 2/1993 | Alten et al. | |

(Continued)

FOREIGN PATENT DOCUMENTS

| | | |
|---|---|---|
| CN | 1805245 | 7/2006 |
| GB | 2182730 | 5/1987 |
| SU | 1213296 | 3/1986 |
| SU | 1643834 | 4/1991 |

OTHER PUBLICATIONS

European Search Report.

*Primary Examiner* — Thomas Beach
*Assistant Examiner* — Nicholas L Foster
(74) *Attorney, Agent, or Firm* — O'Shea Getz P.C.

(57) ABSTRACT

According to the present invention, an annular face seal arrangement for a gas turbine engine is provided that includes a mounting ring, a mounting member, a rotor, and a stator. The mounting ring has a width extending between a first axial end and a second axial end. The mounting member has a clamp portion and a biasing portion. The clamp portion extends axially between a first clamping surface and a second clamping surface. The biasing portion includes a first segment and a second segment. The second segment has a width and a rotor contact surface. The rotor has a rotor seal surface and a clamp portion having a width. The stator has a stator seal surface that is aligned with the rotor seal surface. The mounting ring is disposed radially inside of the rotor and radially inside of at least part of the biasing portion, and is disposed in contact with the second clamping surface of the clamp portion. The rotor contact surface of the biasing portion is disposed in contact with the rotor.

15 Claims, 4 Drawing Sheets

U.S. PATENT DOCUMENTS

| | | | |
|---|---|---|---|
| 5,244,216 A * | 9/1993 | Rhode | 277/303 |
| 5,464,227 A | 11/1995 | Olson | |
| 5,544,896 A | 8/1996 | Draskovich et al. | |
| 5,626,347 A * | 5/1997 | Ullah | 277/399 |
| 5,639,096 A * | 6/1997 | Ullah | 277/401 |
| 6,322,081 B1 * | 11/2001 | Ullah et al. | 277/504 |
| 6,530,573 B1 * | 3/2003 | Merkin et al. | 277/370 |
| 6,655,695 B1 | 12/2003 | Sund et al. | |

\* cited by examiner

US 8,167,314 B2

DISTORTION RESISTANT FACE SEAL COUNTERFACE SYSTEM

BACKGROUND OF THE INVENTION

1. Technical Field

This disclosure relates generally to a sealing system for use in a gas turbine engine and, more particularly, to a distortion resistant face seal counterface system for use in a gas turbine engine.

2. Background Information

A typical prior art mechanical face seal arrangement within a gas turbine engine (sometimes referred to as a carbon face seal arrangement) includes a stationary seal member disposed in contact with, and sealing against, a rotating seal counterface (also referred to as the seal plate). The counterface is locked into place relative to a rotating engine shaft by an axially directed compressive force that may, depending upon the application, be several thousands of pounds in magnitude. In some applications, the compressive force is applied non-uniformly around the circumference of the shaft. As a result, the seal counterface may warp and assume a "wavy" configuration wherein the seal surface of the counterface is not planar; i.e., the axial position of the seal surface varies as a function of circumferential position.

It is known that rubbing between the counterface and the stationary seal member can generate significant amounts of heat, and consequent thermal gradients within the counterface. The thermal gradient forms because the surface (i.e., the seal surface) of the counterface in contact with the seal member rises to a much higher temperature during operation, than an aft surface on the opposite side of the counterface. The portion of the counterface proximate the seal surface will, as a result, experience greater thermal expansion than the aft surface. The difference in thermal expansion causes the seal surface to diverge from its original planar orientation, away from the stationary seal member, resulting in the counterface assuming a cone-like geometry. This deformation is typically referred to as "coning". Coning can create an undesirable gas leakage path between the seal surface of the seal counterface and the seal member. Coning can also lead to excessive wear of the members that are in running contact.

One prior art approach to preventing the deformation of the counterface caused by coning has been to provide external or internal cooling of the counterface in the form of oil jets, cooling fins, or cooling passages. However, this approach adds significant complexity to the design of the counterface and is expensive. Another approach to preventing the deformation of the counterface has been to make the counterface from a ceramic. However, ceramics may cause other problems due to their brittleness.

SUMMARY OF THE DISCLOSURE

According to an aspect of the present invention, an annular face seal arrangement for a gas turbine engine is provided that includes a mounting ring, a mounting member, a rotor, and a stator. The mounting ring has a width extending between a first axial end and a second axial end opposite the first axial end. The mounting member has a clamp portion and a biasing portion. The clamp portion extends axially between a first clamping surface and a second clamping surface. The biasing portion includes a first segment and a second segment. The second segment has a width and a rotor contact surface. The rotor has a rotor seal surface and a clamp portion having a width. The stator has a stator seal surface that is aligned with the rotor seal surface. The mounting ring is disposed radially inside of the rotor and radially inside of at least part of the biasing portion, and is disposed in contact with the second clamping surface of the clamp portion. The rotor contact surface of the biasing portion is disposed in contact with the rotor. The sum of the second segment and clamp portion widths is greater than the width of the mounting ring, thereby causing the biasing portion to be biased against the rotor.

According to another aspect of the present invention, an annular face seal arrangement for a gas turbine engine is provided that includes a mounting ring, a mounting member, a rotor, and a stator. The mounting member has a clamp portion and a biasing portion. The stator has a seal surface. The rotor has an outer connecting segment disposed between an outer leg and a middle leg, an inner connecting segment disposed between an inner leg and the middle leg, and a seal surface. Each of the legs has a width, and each of the connecting segments has a width, and the widths of the legs are greater than the widths of the connecting segments. The rotor seal surface aligns with the stator seal surface.

DETAILED DESCRIPTION OF THE INVENTION

Figure 1:
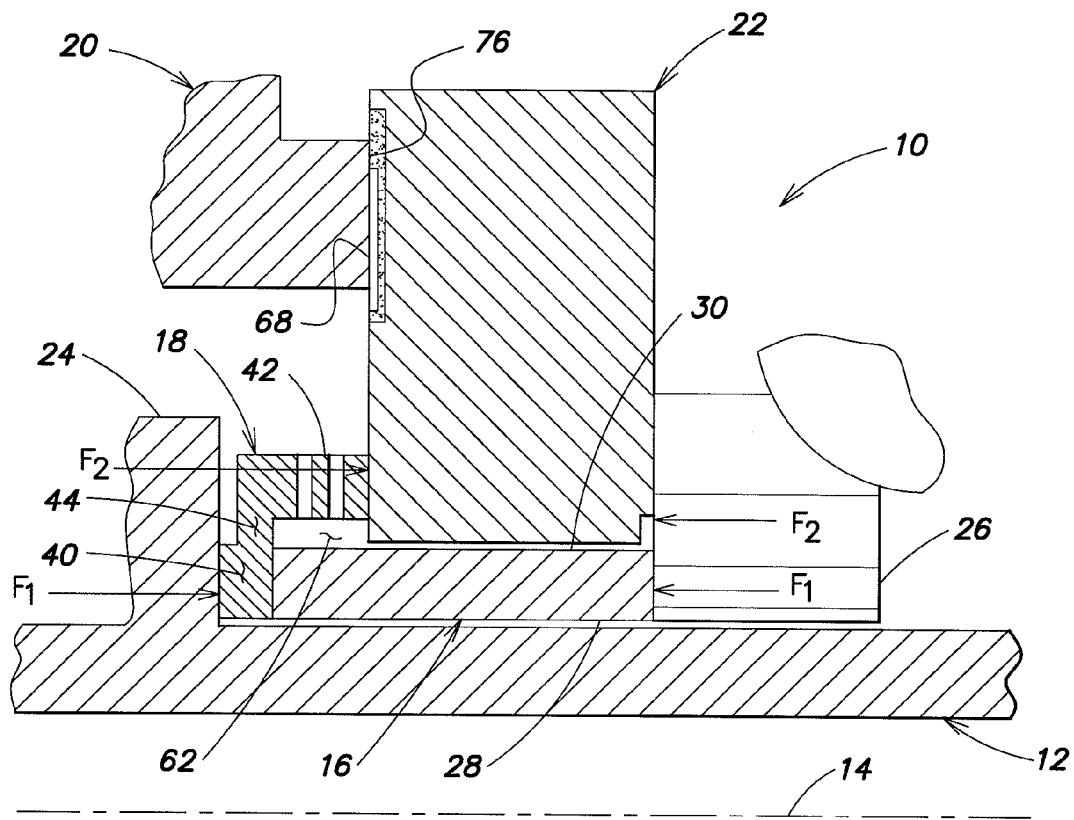
FIG. 1 is a diagrammatic illustration of a first embodiment of a face seal arrangement.

FIG. 1 is a diagrammatic illustration of a first embodiment of an annular face seal arrangement 10 for sealing between a stator and a rotor fixed to a shaft 12 rotatable about an axial centerline 14 within a gas turbine engine. The seal arrangement 10 includes a mounting ring 16, a mounting member 18, a stator 20 and a rotor 22.

Figure 2:
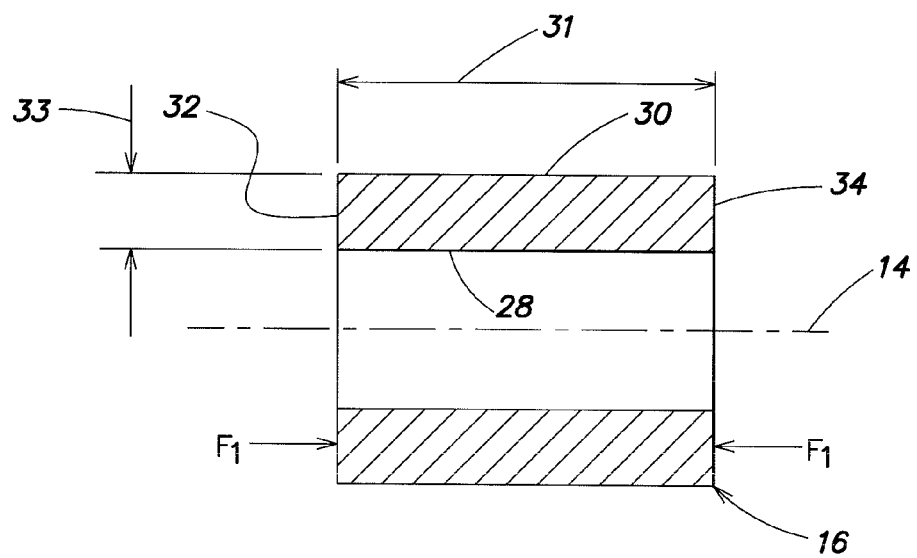
FIG. 2 is a diagrammatic illustration of one embodiment of an annular mounting ring.

Now referring to FIG. 2, the mounting ring 16 is an annular body having a width 31 that extends between a first axial end 32 and a second axial end 34. The radial cross-section of the mounting ring at any circumferential position has a height 33 that extends between an inner surface 28 and an outer surface 30, where the inner surface is the bore of the annular body.

Figure 3B:
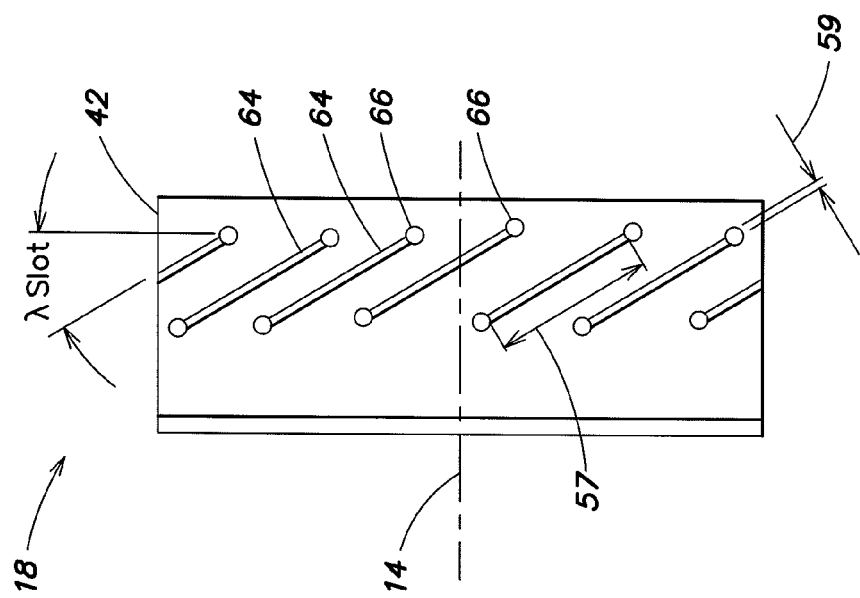
FIG. 3B is a diagrammatic illustration of the mounting member in FIG. 3A.
Figure 3A:
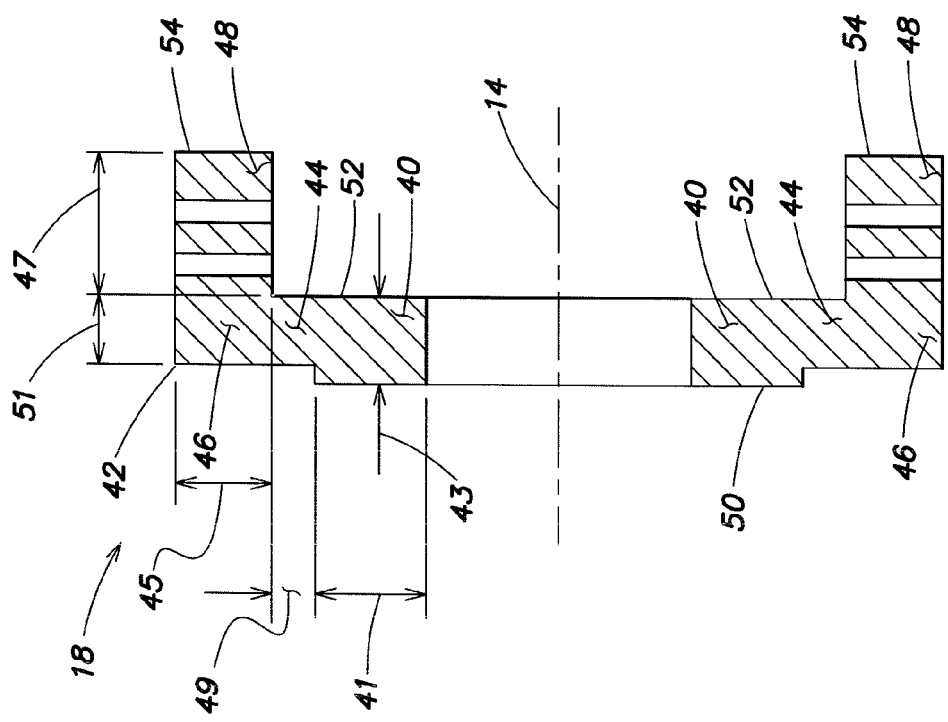
FIG. 3A is a diagrammatic illustration of one embodiment of a annular mounting member.

Now referring to FIGS. 3A to 3B, the mounting member 18 includes a clamp portion 40, a biasing portion 42, and in some embodiments an intermediate portion 44 disposed between the clamp and biasing portions 40, 42. The clamp portion 40 has a height 41 and a width 43. The biasing portion 42 includes a first segment 46 and a second segment 48. The second segment 48 has a height 45, a width 47, and a rotor contact surface 54. The intermediate portion 44 has a height 49 and a width 51. In the embodiment shown in FIGS. 3A and 3B, the first segment 46 and the intermediate portion 44 have widths 51 that are less than the width 43 of the clamp portion. In other embodiments, the clamp portion 40, intermediate portion 44, and the first segment 46 have equal widths. The clamp portion 40 extends axially between a first clamping surface 50 and a second clamping surface 52. The second clamping surface 52 is axially positioned between the first clamping surface 50 and the rotor contact surface 54. In the present embodiment, the geometry of the mounting member portions 40, 42, 44 is such that the biasing portion 42 is cantilevered from the clamp portion 40 of the mounting member 18.

In some embodiments, the mounting member 18 includes a plurality of optional slots 64. The slots 64 are disposed circumferentially around the biasing portion 42 of the mounting member 18. Each slot has a length 57, a width 59, and is disposed at a slot angle $\lambda_{slot}$ between 0° and 90° relative to the axial centerline 14. One or both ends of each slot may be terminated with an aperture 66 that reduces the potential of a crack propagating into the second segment 48 from a slot 64. The geometry of the slots 64 and/or the number of the slots 64 disposed around the circumference (i.e., the pitch) of the mounting member 18 can be varied to adjust the spring load-deflection properties of the mounting member 18, as will be discussed below.

Figure 4:
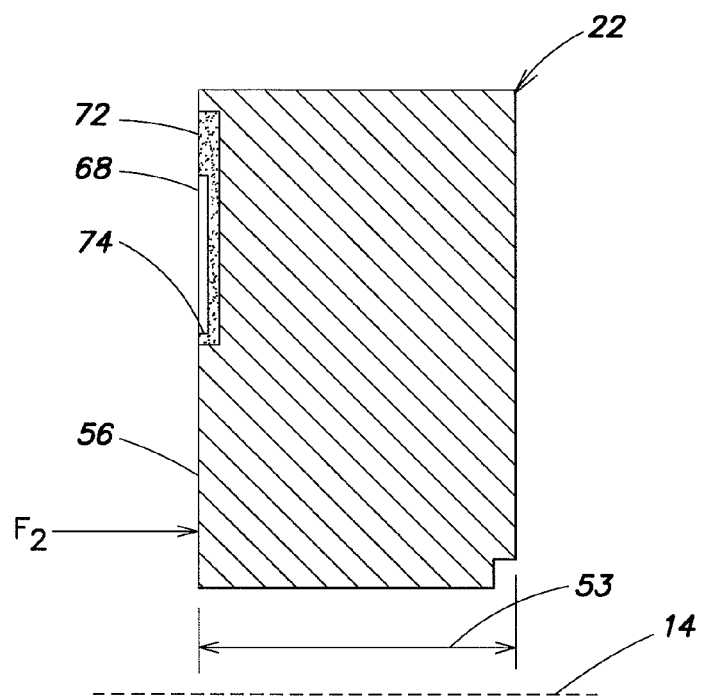
FIG. 4 is a diagrammatic illustration of one embodiment of an annular rotor.

Now referring to FIG. 4, the rotor 22 includes a clamp portion 56, a rotor seal surface 68, and a width 53. The rotor seal surface 68 is aligned with a stator seal surface 76 disposed on the stator 20, thereby defining a seal between the two seal surfaces 68, 76. In some embodiments, the seal surface 68 includes an optional hard coat portion 72 and/or one or more lift-off grooves 74. The hard coat portion 72 and the lift off grooves 74 are operable to decrease distortions and/or wear in the rotor 22.

Figure 5:
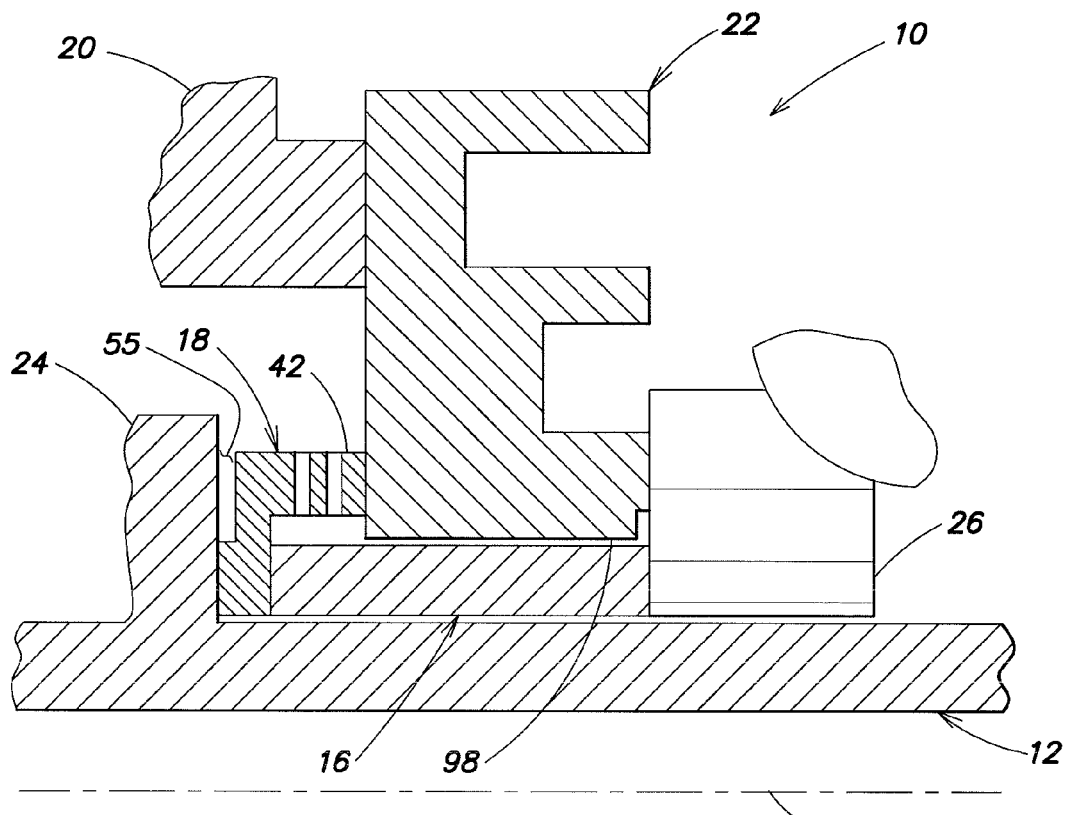
FIG. 5 is a diagrammatic illustration of a second embodiment of a face seal arrangement.
Figure 6:
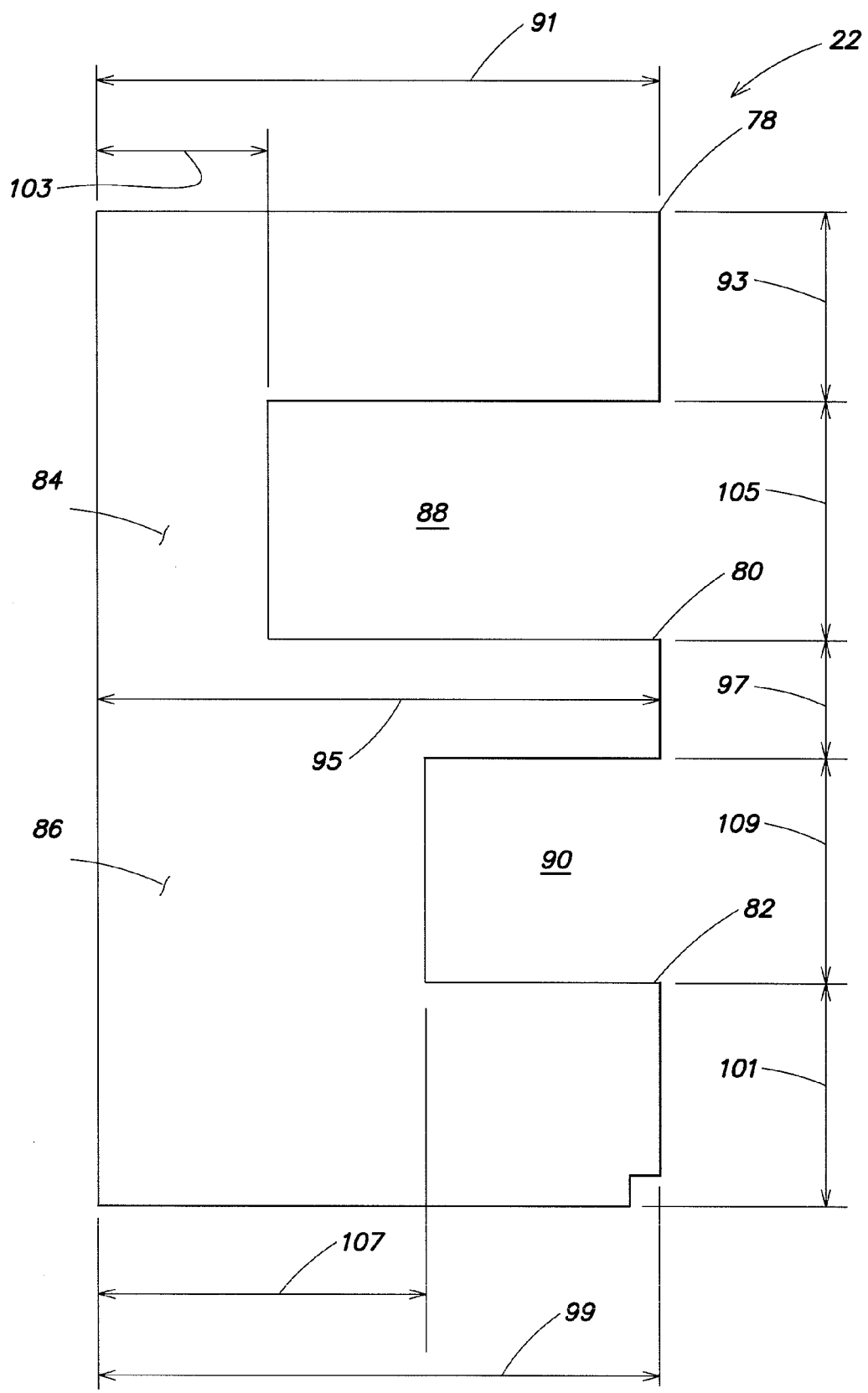
FIG. 6 is a diagrammatic illustration of another embodiment of the annular rotor.

FIGS. 5 and 6 illustrate an embodiment of the face seal arrangement 10 that has an alternative "E" shaped rotor 22 geometry. The rotor 22 includes an outer leg 78, a middle leg 80, an inner leg 82, an outer connecting segment 84, and an inner connecting segment 86. The outer leg 78, the outer connecting segment 84 and the middle leg 80 define a first annular rotor channel 88. The middle leg 80, the inner connecting segment 86 and the inner leg 82 define a second annular rotor channel 90. The outer leg 78 has a width 91 and a height 93. The middle leg 80 has a width 95 and a height 97. The inner leg 82 has a width 99 and a height 101. The outer connecting segment 84 has a width 103 and a height 105. The inner connecting segment 86 has a width 107 and a height 109.

The relative geometries of the legs 78, 80, 82 and the connecting segments 84 and 86 give the rotor its "E" shaped configuration. Within that configuration, however, the relative dimensions can be relatively varied to produce a geometry that thermally expands in a predetermined manner for a given set of operating conditions; e.g., radially neutral coning away from the stator 20, coning toward the stator 20, etc.

In the example shown in FIG. 6, the relative dimensions are as follows: a) the width 91 of the outer leg 78 and the width 95 of the middle leg 80 are greater than the width 103 of the outer connecting segment 84; b) the width 95 of the middle leg 80 and the width of the inner leg 82 are greater than the width 107 of the inner connecting segment 86; c) the widths of the legs 78, 80, 82 are all greater than the widths 103, 107 of the connecting segments 84, 86; d) the width 107 of the inner connecting segment 86 is greater than the width 103 of the outer connecting segment; e) the height 93 of the outer leg 78 is greater than the height 97 of the middle leg 80; and f) the height of the outer connecting segment 84 is greater than the height 109 of the inner connecting segment 86.

The specific relative dimensions of the legs 78, 80, 82 and the connecting segments 84, 86 within the "E" configuration can be adjusted to create the desired operational rotor 22 configuration for the application at hand. For example, the relative dimensions of the "E" shaped rotor 22 can be configured such that during operation the rotor seal surface 68 is biased towards the stator seal surface 76. Alternatively, the rotor 22 can be configured to reduce wear between the rotor seal surface 68 and the stator seal surface 76 by decreasing rotor bias towards the stator 20. Thermal expansion is a function of the temperature of the material. A rotor 22 configuration that has a plurality of different size sections (e.g., an "E" shaped configuration) will have different amounts of thermal expansion in the different sections because the certain sections (e.g., smaller sections, and/or sections closer to the thermal energy source) will be at a higher temperature (and therefore subject to greater expansion) than other sections (e.g., larger sections and/or sections farther away from the thermal energy source). The desired amount of coning (toward, away, neutral) can be achieved by the selective sizing and positioning of the different legs and segments.

Now referring to FIG. 5, the arrangement 10 includes an optional rotor seal 98. The rotor seal is configured between the rotor 22 and the mounting ring 16 and is operable to prevent fluid weepage. Some examples of the optional rotor seal include, but are not limited to, an elastomer o-ring, a Teflon® c-seal, or a piston ring seal.

Now referring to FIGS. 1 and 5, when the seal arrangement 10 is assembled on the shaft 12 of a gas turbine engine, the mounting ring 16, mounting member 18, and rotor 22 are clamped to the shaft. In the embodiment shown in FIG. 5, the mounting ring 16 and the mounting member 18 are clamped between a shoulder 24 in the shaft 12 and a bearing race 26 by an axial clamping force F1. The present seal arrangement 10 can be disposed at numerous positions along a shaft and is not therefore limited to the illustrative clamping embodiments shown in FIGS. 1 and 5. The rotor 22 is axially clamped between the bearing race 24 and the mounting member 18, and is therefore fixed to the shaft by axial clamping force F2. The biasing portion 42 is biased against the clamp portion 56 of the rotor 22 because the sum of the width 47 of the second segment 48 and the width 53 of the clamp portion 56 of the rotor 22 (illustrated in FIG. 4) is greater than the width 31 of the mounting ring 16 (illustrated in FIG. 2). Clamping force F2 is a product of the biasing portion 42 of the mounting member 18 and is not substantially related to the clamping force F1, and is typically appreciably less than F1. The mounting member 18 can be configured to produce a predetermined clamping force F2 by selective use of slots 64 disposed within the biasing portion 42 of the mounting member 18. Specifically, the spring stiffness of the biasing portion 42 of the mounting member 18 can be "tuned" to a desired load using slots configured with particular slot characteristics: slot length 57, slot width 59, slot angle $\lambda_{slot}$, slot pitch, etc., which characteristics can be adjusted relatively speaking to suit the application at hand.

In the embodiment shown in FIGS. 3A and 3B, the first segment 46 and the intermediate portion 44 have widths 51 that are less than the width 43 of the clamp portion. As a result of the difference in widths, a gap 55 (see FIG. 5) is formed between the shoulder 24 of the shaft 12 and the biasing portion 42 of the mounting member 18. In addition, in the embodiment shown in FIGS. 3A and 3B, the height 49 of the intermediate portion 44 relative to the height 33 of the mounting ring 16 is such that a gap 62 is formed between the second segment 42 and the mounting ring 16.

During operation of the gas turbine engine, the shaft 12 rotates about the axial centerline 14. The rotor 22 rotates relative to the stator 20 and thermal energy is developed by the frictional interaction between the rotor seal surface 68 and the stator seal surface 76. The thermal energy causes the rotor 22 to thermally expand. Depending upon the configuration of the rotor 22, as described above, the rotor 22 will cone toward or away from the stator 20, or will thermally expand in an axially neutral direction.

While various embodiments of the distortion resistant face seal counterface system have been disclosed, it will be apparent to those of ordinary skill in the art that many more embodiments and implementations are possible within the scope of the method. For example, the mounting ring 16, mounting member 18, the rotor 22, and the stator 20 are described above as having annular configurations. In some embodiments, the annular configurations may be a single annular body. In other embodiments, one or more of the mounting ring 16, mounting member 18, the rotor 22, and the stator 20 may be formed in sections that collectively form an annular body.

What is claimed is:

1. An annular face seal arrangement for a gas turbine engine, comprising:
    a mounting ring having an overall width extending between a first axial end and a second axial end, and a radial outer surface that extends between the first axial end and the second axial end;
    a mounting member having a clamp portion and a biasing portion, which clamp portion axially extends between a first clamping surface and a second clamping surface, which biasing portion includes a first segment and a second segment, which second segment has a width and a rotor contact surface;
    a rotor having a rotor seal surface and a clamp portion having a width; and
    a stator having a stator seal surface, wherein the stator seal surface is aligned with the rotor seal surface;
    wherein the mounting ring is disposed radially inside of the rotor and radially inside of at least part of the biasing portion, and is disposed in direct contact with the clamp portion of the mounting member, and the rotor contact surface of the biasing portion is disposed in contact with the rotor; and
    wherein the sum of the width of the second segment of the biasing portion and the width of the clamp portion of the rotor is greater than the overall width of the mounting ring, and the biasing portion is biased against the rotor.

2. The face seal arrangement of claim 1, wherein the mounting member further includes an intermediate portion disposed between the clamp portion and the biasing portion, which intermediate portion has a height sized to define an annular channel between the mounting ring and the biasing portion of the mounting member.

3. The face seal arrangement of claim 1, wherein the clamp portion of the mounting member has a width and the first segment of the biasing portion has a width, and the clamp portion width is greater than the first segment width.

4. The face seal arrangement of claim 1, wherein a plurality of slots is disposed in the second segment of the biasing portion.

5. The face seal arrangement of claim 4, wherein each slot extends through the second segment.

6. The face seal arrangement of claim 5, wherein each end of each slot terminates in an aperture.

7. The face seal arrangement of claim 1, wherein
    the rotor includes an outer connecting segment disposed between an outer leg and a middle leg, and an inner connecting segment disposed between an inner leg and the middle leg;
    wherein each of the legs has a width, and each of the connecting segments has a width, and the widths of the legs are greater than the widths of the connecting segments.

8. The face seal arrangement of claim 1, wherein the mounting member further includes an intermediate portion disposed between the clamp portion and the first segment of the biasing portion, and which intermediate portion has a width that is substantially equal to a width of the first segment of the biasing portion.

9. An annular face seal arrangement for a gas turbine engine, comprising:
    a mounting ring having an overall width extending between a first axial end and a second axial end, and a radial outer surface that extends between the first axial end and the second axial end;
    a mounting member having a clamp portion and a biasing portion;
    a stator having a seal surface;
    a rotor including an outer connecting segment disposed between an outer leg and a middle leg, an inner connecting segment disposed between an inner leg and the middle leg, and a seal surface;
    wherein each of the legs has a width, and each of the connecting segments has a width, and the widths of the legs are greater than the widths of the connecting segments; and
    wherein the rotor seal surface aligns with the stator seal surface;
    wherein the mounting ring is disposed radially inside of the annular rotor and at least a portion of the biasing portion of the mounting member, and the mounting ring is disposed in directly contact with the clamp portion, and the biasing portion is disposed in contact with the rotor.

10. The face seal arrangement of claim 9, wherein an intermediate portion is disposed between the clamp portion and the biasing portion.

11. The face seal arrangement of claim 10, wherein the intermediate portion has a height sized to define an annular channel between the biasing portion and the mounting ring.

12. The face seal arrangement of claim 9, wherein a first annular rotor channel is defined by the outer leg, the outer connecting segment, and the middle leg, and a second annular rotor channel is defined by the middle leg, the inner connecting segment and the inner leg.

13. The face seal arrangement of claim 12, wherein the width of the inner connecting segment is greater than the width of the outer connecting segment.

14. The face seal arrangement of claim 12, wherein the inner connecting segment has a height and the outer connecting segment has a height, and the inner connecting segment height is less than the outer connecting segment height.

15. The face seal arrangement of claim 12, wherein the outer leg width and the inner leg width are greater than the middle leg width.

* * * * *